Figure 1:
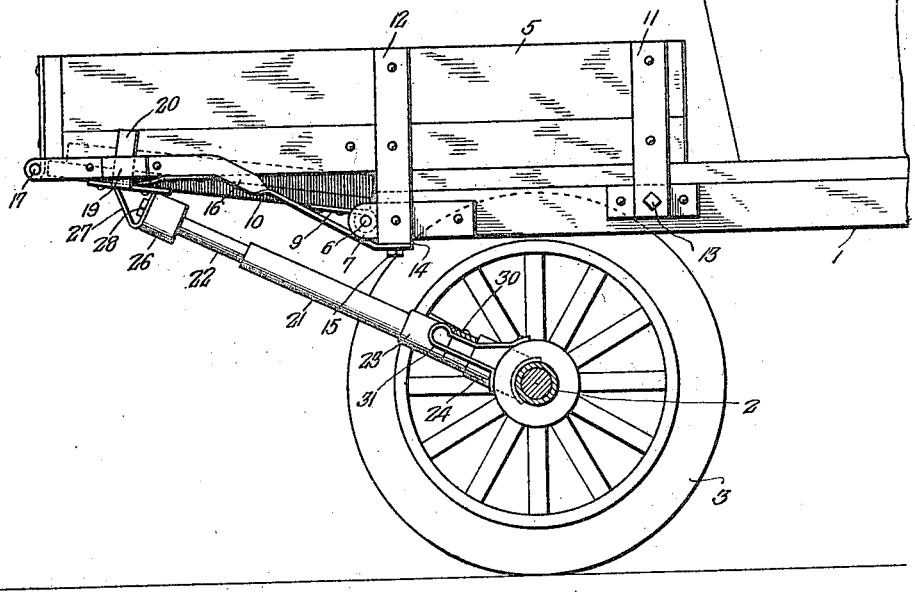

J. K. SHANNON.
DETACHABLE TRUCK BODY FOR AUTOMOBILES.
APPLICATION FILED FEB. 14, 1920.

1,384,162.

Patented July 12, 1921.

2 SHEETS—SHEET 1.

WITNESSES

INVENTOR
J. K. Shannon,
BY
ATTORNEYS

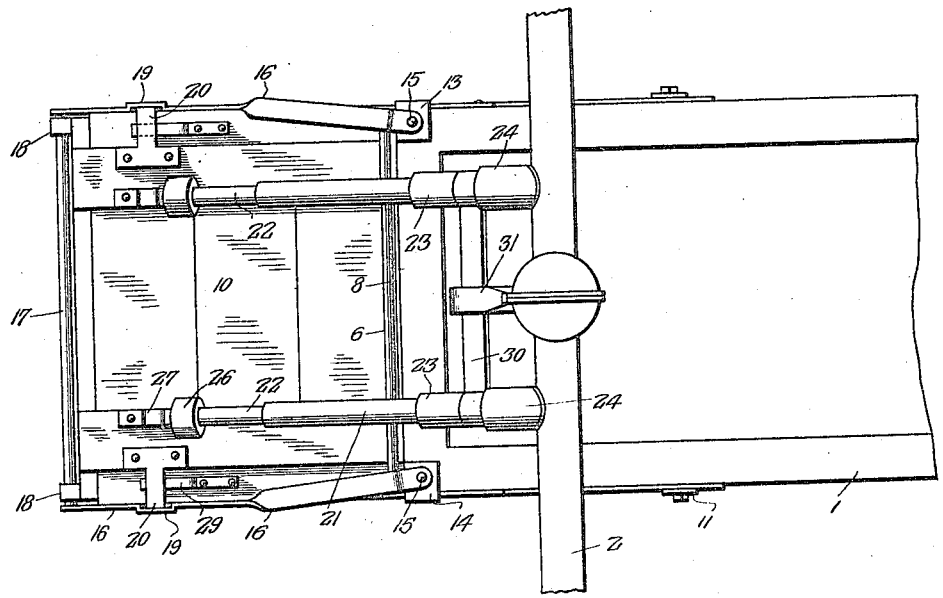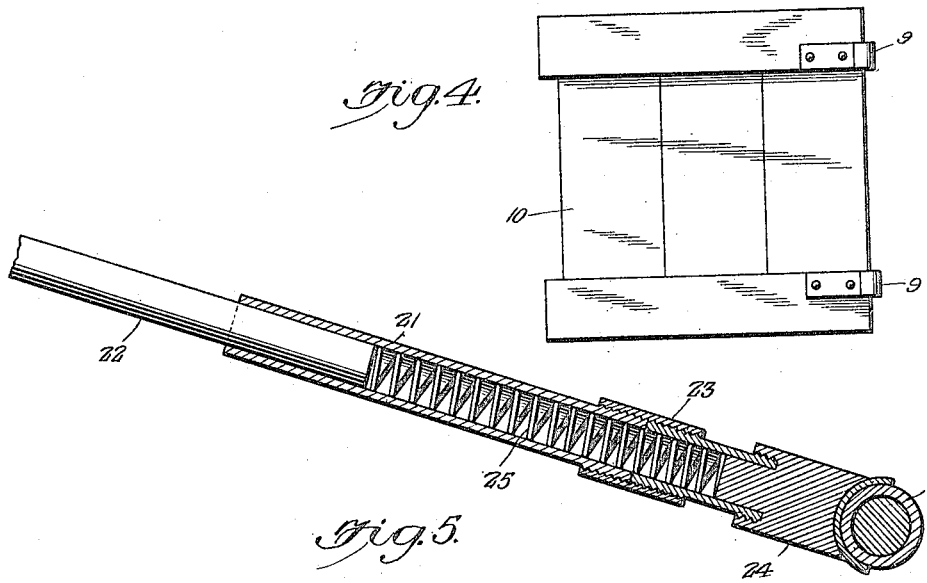

UNITED STATES PATENT OFFICE.

JOHN KNOX SHANNON, OF MARSHALL, MISSOURI.

DETACHABLE TRUCK-BODY FOR AUTOMOBILES.

1,384,162. Specification of Letters Patent. Patented July 12, 1921.

Application filed February 14, 1920. Serial No. 358,695.

*To all whom it may concern:*

Be it known that I, JOHN KNOX SHANNON, a citizen of the United States, and a resident of Marshall, in the county of Saline and State of Missouri, have invented certain new and useful Improvements in Detachable Truck-Bodies for Automobiles, of which the following is a specification.

My invention is an improvement in detachable truck bodies for automobiles, and has for its object to provide a truck body which may be easily and quickly attached to or detached from a Ford runabout, for instance, and wherein means is provided for reinforcing the springs of the vehicle, the said means being arranged between the rear axle and the detachable truck body.

Figure 2:
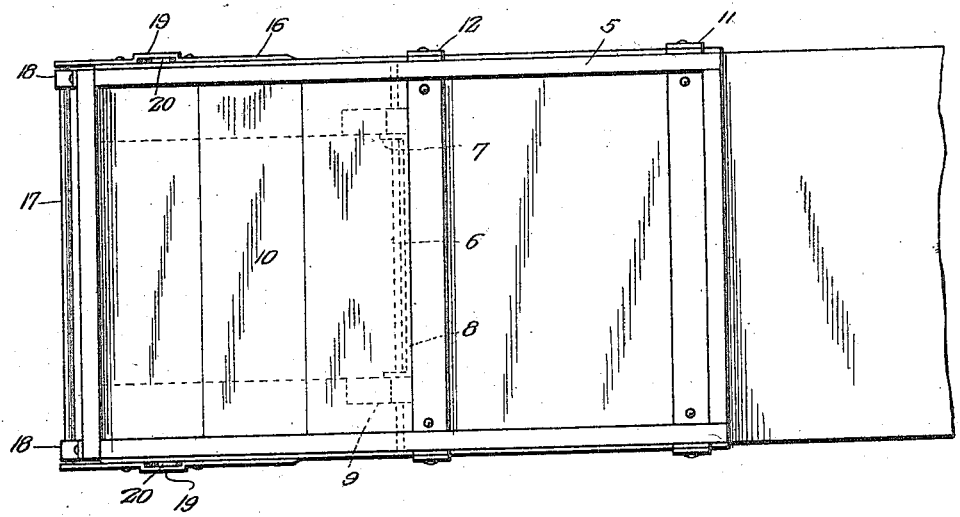

In the drawings:

Figure 1 is a side view of a portion of a motor vehicle provided with the detachable truck body, Fig. 2 is a top plan view of the truck body, Fig. 3 is a bottom plan view, Fig. 4 is a top plan view of the bottom of the body, Fig. 5 is an enlarged sectional view of the sliding connection between the axle and the body.

The present embodiment of the invention is shown in connection with the chassis 1 of a motor vehicle, having the usual rear axle supported within the housing 2 and carrying wheels 3. The usual springs (not shown) are arranged between the frame and the axle housing, and the truck body is adapted to be seated upon that portion of the frame 1 which projects in rear of the body 4.

The detachable truck body comprises a substantially rectangular box frame 5, and a bottom 10 which fits within the rear half of the truck body, namely that half which extends behind the chassis. This bottom is hinged at its forward end to the rear of the truck body, by means of hinged bearings 9 on the bottom to a shaft 6 which is journaled in angular lugs 7 on the strap 8 secured to the rear of the chassis.

The forward end of the box body 5 rests upon the upper face of the chassis, and the said body has plates 11 and 12 which extend below the box body and lap on the sides of the chassis. The plates 11 have openings which register with openings in the side members of the chassis, and bolts and nuts indicated at 13 are passed through the openings to connect the box body to the chassis.

The plates 12 have at their lower end inwardly bent portions 14 which lap upon the underface of the chassis, and are connected thereto by bolts 15. These bolts also connect straps 16 to the chassis, the rear ends of the straps being secured to the lower side of the box frame as shown.

Each of these straps consists of two portions extending at an obtuse angle with respect to each other, one portion being lapped upon the side of the box frame and the other extending downwardly and forwardly to a connection with the adjacent bolt 15. Each of the straps is given a quarter turn as clearly shown in Fig. 1, so that the ends will lap flat upon the box body and upon the underface of the chassis.

The straps 16 extend rearwardly beyond the box body, and have openings for receiving the ends of the shaft 17 which is journaled in bearings 18 on the box frame. Each strap has near its outer end an outwardly offset portion 19, and in these outwardly offset portions which form keepers, arms 20 are mounted to slide, the said arms being connected with the bottom 10.

The rear end of the bottom 10 is supported from the axle housing by means of the sectional braces shown in Figs. 1, 3 and 5. Each of these braces consists of an outer section 21 connected to the axle housing and an inner section 22 connected with the bottom.

The outer section as shown in Fig. 5, is composed of two portions which are connected by a union 23, and one portion engages a saddle 24 which bears against the axle housing 2. A coil spring 25 is seated in the section 21 between the saddle and the section 22 which is a plunger.

The section 22 is connected to the bottom by means which includes a head 26 fixed to the end remote from the section 21, and each of the heads is secured to the bottom by means of a stirrup 27. The section 22 passes through the head 26 and through one arm of the stirrup and has a nut 28 threaded thereon between the stirrup arms.

Thus the rear end of the bottom 10 is spring supported by the braces 21—22 and it is guided in its movement with respect to the box body by means of the arms 20 and the keepers 19. A plate spring 29 is secured to the box body at each side, and each spring at its free end passes over the arm 20. These springs cushion the upward movement of the bottom with respect to the body, and the braces 21—22 cushion the downward movement.

The portions of the sections 21 of the braces which engage the saddle 24 are connected by a cross plate 30, and the cross plate is connected between the braces to the differential casing of the rear axle housing by a stirrup 31. The arms of this stirrup are connected with the differential casing, and the cross bar is connected with the uppermost arm. The cross plate 30 has bearings at its ends which engage the sections 21 of the braces, between the unions 23 and the saddles 24. Thus the saddles are prevented from disengagement with the axle housing.

The stirrup 31 is resilient, and thus provides a resilient connection between the cross plate 31 and the axle housing.

The bottom 10 has no connection with the box body, being held in place within the box body 5, by the connection 21—23. It is guided in its movement by the engagement of the arms 20 with the keepers 19, and it will be obvious that these arms will be of a length such that they will not disengage the keepers under the greatest stress that will be placed upon the bottom. The saddles 24 move on the housing of the axle, as will be evident from an inspection of Fig. 5, merely resting on the housing.

I claim:

1. A detachable truck body comprising a box body, means for detachably connecting said body to the frame of a motor vehicle with the box body extending beyond the frame, a bottom having a section closing the rear end of the box body, means for hinging the front end of the section to the frame, resilient supports arranged between the rear end of the section and the rear axle housing, means for guiding the section at its rear end with respect to the box body in its vertical movement, said means comprising arms on the section extending upwardly alongside the body, and keepers on the body with which the arms engage.

2. A detachable truck body comprising a box body, means for detachably connecting said body to the frame of a motor vehicle with the box body extending beyond the frame, a bottom having a section closing the rear end of the bottom, means for hinging the front end of the bottom section to the frame, resilient supports arranged between the rear end of the bottom section and the rear axle housing, means for guiding the bottom section at its rear end with respect to the box body in its vertical movement, said resilient supports comprising telescoping members one of which rests upon the axle housing and the other of which is connected to the bottom, and a spring arranged between the sections, the sections adjacent to the axle housing being connected near the axle housing, and a resilient support for the connection connected with the axle housing.

3. A detachable truck body comprising a box body, means for detachably connecting said body to the frame of a motor vehicle with the box body extending beyond the frame, a bottom having a section closing the rear end of the bottom, means for hinging the front end of the bottom to the frame, resilient supports arranged between the rear end of the bottom section and the rear axle housing, means for guiding the bottom section at its rear end with respect to the box body in its vertical movement, said resilient supports comprising telescoping members one of which rests upon the axle housing and the other of which is connected to the bottom section, and a spring arranged between the sections.

4. A detachable truck body, comprising a box body, means for detachably connecting said body to the frame of a motor vehicle with the box body extending beyond the frame, a bottom having a section closing the rear end of the box body, means for hinging the front end of the bottom section to the frame, resilient supports arranged between the rear end of the bottom section and the rear axle housing, and means for guiding the bottom section at its rear end with respect to the box body in its vertical movement.

5. A detachable truck body comprising a box body, means for detachably connecting said body to the frame of a motor vehicle with the box body extending beyond the frame, a bottom section closing the rear end of the box body, means for hinging the front end of the bottom section to the frame, and resilient supports arranged between the rear end of the bottom section and the rear axle housing.

6. In a motor vehicle, a detachable truck body adapted to be seated on the rear of the motor vehicle frame, and extending beyond the frame, a bottom having a section hinged to the frame and closing the rear of the body, and a resilient support between the rear end of the bottom section and the rear axle housing, and means in connection with the body and the bottom section for guiding said bottom section in its vertical movement.

7. In a motor vehicle, a detachable truck body adapted to be seated on the rear of the motor vehicle frame, and extending beyond the frame, a bottom having a section hinged to the frame and closing the rear of the bottom section, and a resilient support between the rear end of the bottom section and the rear axle housing.

8. In a motor vehicle, a detachable truck body adapted to be seated on the rear of a motor vehicle and to extend beyond the same, and comprising an open frame, a bottom having a section hinged to the truck body and closing the rear of the frame, and means for supporting the rear end of said bottom from the rear axle housing.

JOHN KNOX SHANNON.